(12) United States Patent
Gilchrist et al.

(10) Patent No.: US 8,657,604 B2
(45) Date of Patent: Feb. 25, 2014

(54) RECIPE INSTRUCTION BOOK UTILIZING INGREDIENT STICKERS AND VISUALLY IDENTIFIABLE MEASURING INSTRUMENTS

(75) Inventors: Suzanne Gilchrist, Columbia, SD (US); Ginger Sperry, Bath, SD (US)

(73) Assignee: ConKrist LLC, Columbia, SD (US)

( * ) Notice: Subject to any disclaimer, the term of this patent is extended or adjusted under 35 U.S.C. 154(b) by 24 days.

(21) Appl. No.: 13/561,164

(22) Filed: Jul. 30, 2012

(65) Prior Publication Data
US 2014/0030680 A1   Jan. 30, 2014

(51) Int. Cl.
*G09B 19/00* (2006.01)

(52) U.S. Cl.
USPC ......................................................... 434/127

(58) Field of Classification Search
USPC .................... 434/127, 236, 238; 281/15.1, 51; 283/48.1, 52.1, 63.1, 66.1, 117
See application file for complete search history.

(56) References Cited

U.S. PATENT DOCUMENTS

| | | | | |
|---|---|---|---|---|
| 4,828,498 A * | 5/1989 | Tilney | ........................... | 434/127 |
| 5,269,691 A * | 12/1993 | Waldman | ...................... | 434/429 |
| 7,414,923 B2 * | 8/2008 | Kadokura | ........................ | 368/77 |
| 7,540,741 B2 * | 6/2009 | Kemp et al. | ................... | 434/247 |
| 7,698,640 B2 * | 4/2010 | Krieglstein | ................... | 715/700 |
| 2004/0051295 A1 * | 3/2004 | Gross et al. | .................. | 281/15.1 |
| 2005/0179246 A1 * | 8/2005 | Keller et al. | .................. | 281/15.1 |
| 2005/0206156 A1 * | 9/2005 | Polick | ............................. | 281/38 |
| 2005/0230963 A1 * | 10/2005 | McDowell et al. | ............. | 283/81 |
| 2006/0031245 A1 * | 2/2006 | Krieglstein | ................... | 707/102 |
| 2006/0145465 A1 * | 7/2006 | Hilger et al. | ................. | 281/21.1 |
| 2011/0223570 A1 * | 9/2011 | Bellontine | .................... | 434/236 |
| 2012/0301865 A1 * | 11/2012 | Taylor | ........................... | 434/365 |

* cited by examiner

*Primary Examiner* — Kurt Fernstrom
(74) *Attorney, Agent, or Firm* — Beck & Tysver PLLC (57) ABSTRACT

A recipe book system and method are presented. The system allows non-readers to use a recipe book to prepare foods for cooking or baking. Recipes in the recipe book are presented with images representing ingredients, measuring devices, cooking tools, and instruction steps. Removably-attachable stickers are provided. The stickers may have duplicate images of one or more of the images in the cookbook. In a method for using the recipe book system, a non-reader uses the images in the cookbook to perform actions for food preparation, and then attaches image stickers to a page of the recipe book to indicate that particular actions have been completed.

26 Claims, 6 Drawing Sheets

RECIPE INSTRUCTION BOOK UTILIZING INGREDIENT STICKERS AND VISUALLY IDENTIFIABLE MEASURING INSTRUMENTS

FIELD OF THE INVENTION

The present application relates to the field of recipe books. More particularly, the described embodiments relate to a system and method for utilizing stickers and measuring devices in combination with a picture recipe cookbook. The system and method may be used by non-readers and provides an entertaining food preparation experience.

SUMMARY

One embodiment of the present invention provides a cookbook system for non-readers, particularly children. The system comprises a recipe cookbook in which pictures are used to convey recipe instructions. The cookbook pages contain images representing ingredients to be used in each recipe, as well as images of measurement instruments and cooking tools. Instructions for mixing and heating the recipe ingredients are also presented in picture form. In one implementation of the system and method described herein, a reading adult such as a parent assists a non-reader such as a child to prepare the recipes in the book. In other embodiments, the visual instructions alone allow full use of the recipe book by an individual with no reading skills.

In the preferred embodiment each recipe ingredient image has a matching ingredient sticker that contains a duplicate of the ingredient image. The sticker is manufactured to be removed and reattached multiple times. Ingredient images may be drawings or photographic images of ingredients and ingredient containers. The ingredient stickers may be larger or smaller than the ingredient images on the recipe pages, and could also be the same size. The various images on each recipe page indicate actions to be performed for each recipe, such as adding a specific ingredient in a recipe. After adding the ingredient, an ingredient sticker is placed on a corresponding ingredient image on the recipe book page to indicate that the ingredient has been added.

In the preferred embodiment ingredient stickers can be attached to a "sticker cupboard" when not being used on a recipe page. In one embodiment, the sticker cupboard is separate from the cookbook. The sticker cupboard could also be a page or a flap inside the cookbook. The sticker cupboard may hold many different ingredient stickers. In one embodiment every ingredient used in the recipes of the recipe book has a corresponding sticker.

A set of measuring tools may be used in the system. Measuring cups and measuring spoons having different measurement values are depicted in the cookbook as having different colors, shades, sizes, or shapes. Measurement images pictorially identify which size measuring cup or measuring spoon to use for a particular ingredient. In a preferred embodiment a set of multicolored measuring cups and measuring spoons are provided with the recipe book. In this embodiment, the color of a measurement image on a recipe page corresponds to the color of the measuring cup or measuring spoon needed to measure an ingredient for the recipe. A non-colored set of measuring devices could also be used with color-coded measurement images if a legend is provided to clearly state which colors represent each measurement volume.

A legend may be provided with the recipe cookbook to explain the meaning of images in the recipe book. In one embodiment, the legend may have written text to be read by a reader, such as a parent of a child. Because some recipes can require heating in an oven or over a stove, it may be advantageous to present recipes in such a way that a non-reader requires an amount of supervision from an adult when preparing food. The legend may be presented on a single page in the recipe book separate from recipe pages.

A set of ingredient containers may optionally be included in the system. In an embodiment using special ingredient containers, some of the ingredient images are drawings or photographic images of the ingredient containers. In this embodiment a non-reader can easily match an ingredient picture to the ingredient container and immediately know that the ingredient in the pictured container should be used in the recipe.

A method of using a picture recipe book with ingredient stickers is provided. The method includes matching an image on a recipe book page to an ingredient, matching a measurement image on the recipe book page to a measuring device, using the measuring device to add the ingredient to a food mixture, removing an ingredient sticker matching the ingredient image from a sticker cupboard, and removably attaching the ingredient sticker to the recipe book page to indicate that the ingredient has been added in the recipe. After all of the steps in the recipe have been completed, the ingredient sticker is removed from the recipe book page and reattached to the sticker cupboard.

A method for creating a picture recipe cookbook is provided. The method includes choosing recipes for the picture recipe book and identifying the ingredients in the recipes. Each ingredient is assigned an image, and is given a corresponding ingredient sticker. Measurement values are determined for the ingredients in the recipes, and images are chosen to represent different measuring devices needed for measuring the ingredients. Measurement images may, for example, be color-coded according to the volume of the measurement device.

Recipe cooking tools are determined for the recipes, and are assigned cooking tool images. Recipe instruction steps are determined, and images are chosen to represent performing the steps required to execute the recipe. For example, an arrow may indicate that an ingredient should be poured into a bowl. The images are assembled in a logical order onto a recipe page, and recipe pages are compiled to form a cookbook. The cookbook is then provided with an ingredient cupboard containing each of the ingredient stickers for the ingredients used in the cookbook. The cookbook and ingredient cupboard are then distributed together. In one embodiment measuring devices matching the measurement images and ingredient containers matching the ingredient images are provided with the recipe book. In the preferred embodiment of the method, a legend is provided to help explain the meaning of the images in the recipes.

DETAILED DESCRIPTION

Figure 1:
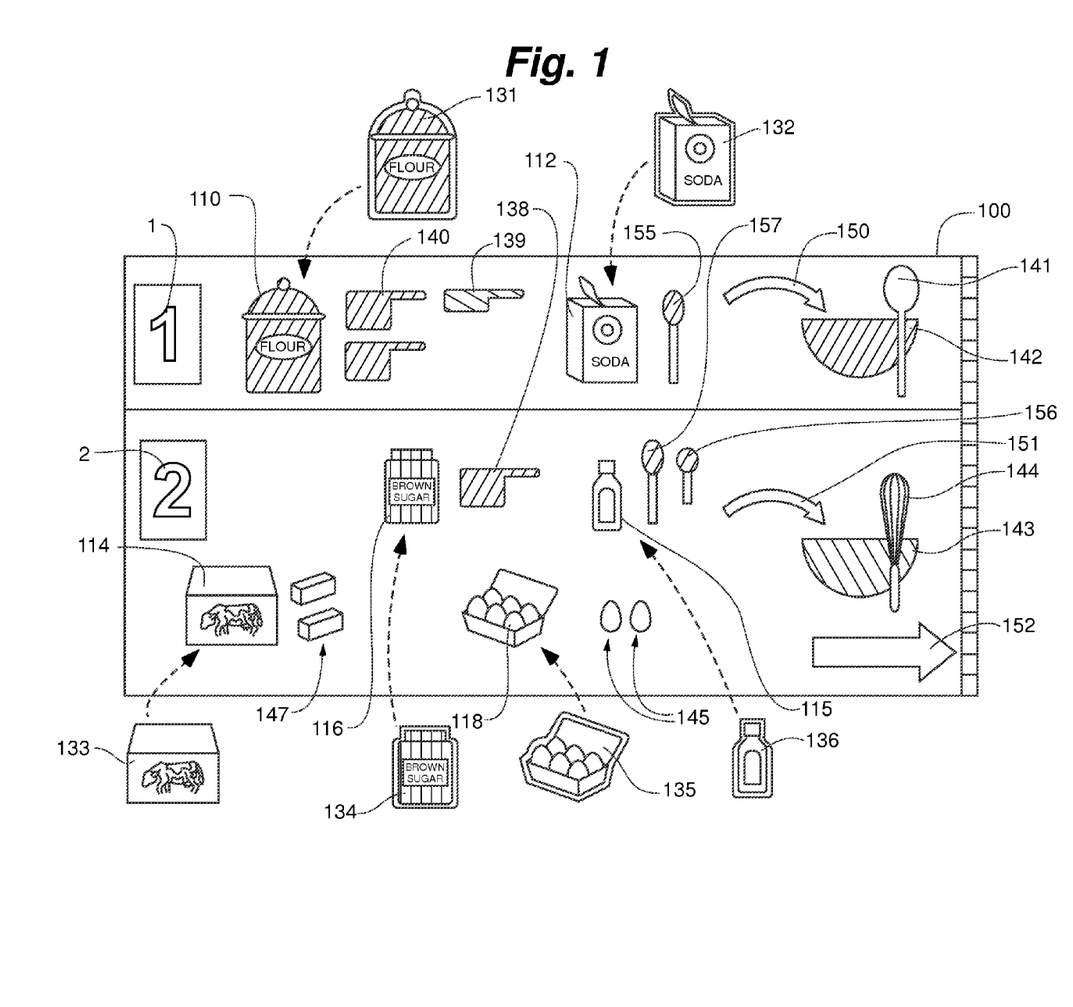
FIG. 1 is a schematic diagram depicting a recipe book page in a system for presenting recipe instructions.

The present disclosure relates to a system for making and using a picture recipe book. FIG. 1 shows a system for presenting recipe instructions. FIG. 1 includes a representative page 100 of a recipe book according to a preferred embodiment. The recipe instructions are presented with numbered steps, such as numbered step 1 and numbered step 2. The recipe book page 100 presents visual representations of ingredients to be added in the recipe, measurement tools to be used, and actions to be performed. The recipe book may be equipped with a key that provides instructions to decipher the meaning of images in the book.

The exemplary page 100 presents a first set of instructions at numerical step 1 and a second set of instructions at numerical step 2. Ingredient images, such as the images of a flour container 110, baking soda container 112, butter 114, brown sugar container 116, egg carton 118, and flavoring bottle 136 indicate that ingredients corresponding to those containers should be used in the recipe. In short, the recipe of page 100 calls for the ingredients of flour, baking soda, butter, brown sugar, eggs, and flavoring. Images of measuring cups 138-140 and measuring spoons 155-157 are measurement indicators that illustrate the amount of ingredient to use. The coloration of the measuring cups 138-140 and measuring spoons 155-157 change based on the measure of ingredient that should be used in the recipe. The coloration could be a color, a hue, a shade, a pattern, or other visually distinct marking to differentiate the amount of ingredient to be used in the recipe. Some ingredients may have special measuring images. For example, the image of butter sticks 147 indicate that two sticks of butter should be used, and the image of individual eggs 145 indicate that two eggs should be used.

In one embodiment of the invention, multicolored measuring cups and measuring spoons are provided with the recipe book. Containers matching one or more of the ingredient container images may also be provided. In this embodiment, measuring devices 138-140 and 155-157 may be drawings or photographic images of the measuring cups and spoons provided. In the embodiment providing ingredient containers with the recipe book, ingredient images 110 and 134 may be drawings or photographic images of the ingredient containers provided with the recipe book.

In interpreting the recipe instructions on the exemplary recipe book page 100, a measurement indicator that is directly to the right of an ingredient image indicates how much of the ingredient to use. A particular ingredient may have a single image of a measuring device, indicating that one measurement should be added. There may also be multiple measurement images to the right of an ingredient, indicating that more than one measure of the ingredient should be used. For example, flour 110 has two 1-cup measurement indicators and one 0.25 cup measurement indicator. This indicates that 2.25 cups of flour should be added in the recipe.

In numerical step 1, the image of arrow 150 represents an instruction step to perform in the recipe. Arrow 150 indicates that all of the ingredients depicted in the images to the left of the arrow should be placed into a bowl represented by bowl image 142. Spoon image 141 represents using a spoon to mix the ingredients together inside the bowl 142. The combination of arrow image 150, bowl image 142, and spoon image 141 taken together represent the instruction step of placing ingredients into a bowl and stirring the ingredients together. Similarly, arrow image 151, bowl image 143, and whisk image 144 represent the steps of adding ingredients to bowl 143 and whisking them together using whisk 144.

FIG. 1 also depicts ingredient stickers that may be attached to page 100 in a temporary fashion. The stickers 131, 132, 133, 134, 135, and 136 are removable and reusable, and can be implemented in a number of different ways. The stickers may have a tacky or sticky back, may attach via a hook-and-loop style fastener, may be made of static-cling vinyl, or may be magnetic. Other methods of removably attaching the stickers to recipe page 100 will be apparent to one skilled in the art, and the embodiments described herein should not be interpreted as limiting.

Each of ingredient stickers 131, 132, 133, 134, 135, and 136 is an icon or duplicate image of one of the ingredient images on page 100. The stickers 131, 132, 133, 134, 135, and 136 are utilized in a method for executing a set of recipe instructions. Although not shown in FIG. 1, another embodiment could use measurement stickers representing duplicate images of measurement images 138, 139, 140, 155, 156, and 157. Cooking tools 141, 142, 143, 144 could also have matching cooking tool stickers. A method for executing a set of instructions and recording that the instructions have been completed will be explained further in relation to FIG. 5.

Figure 2:
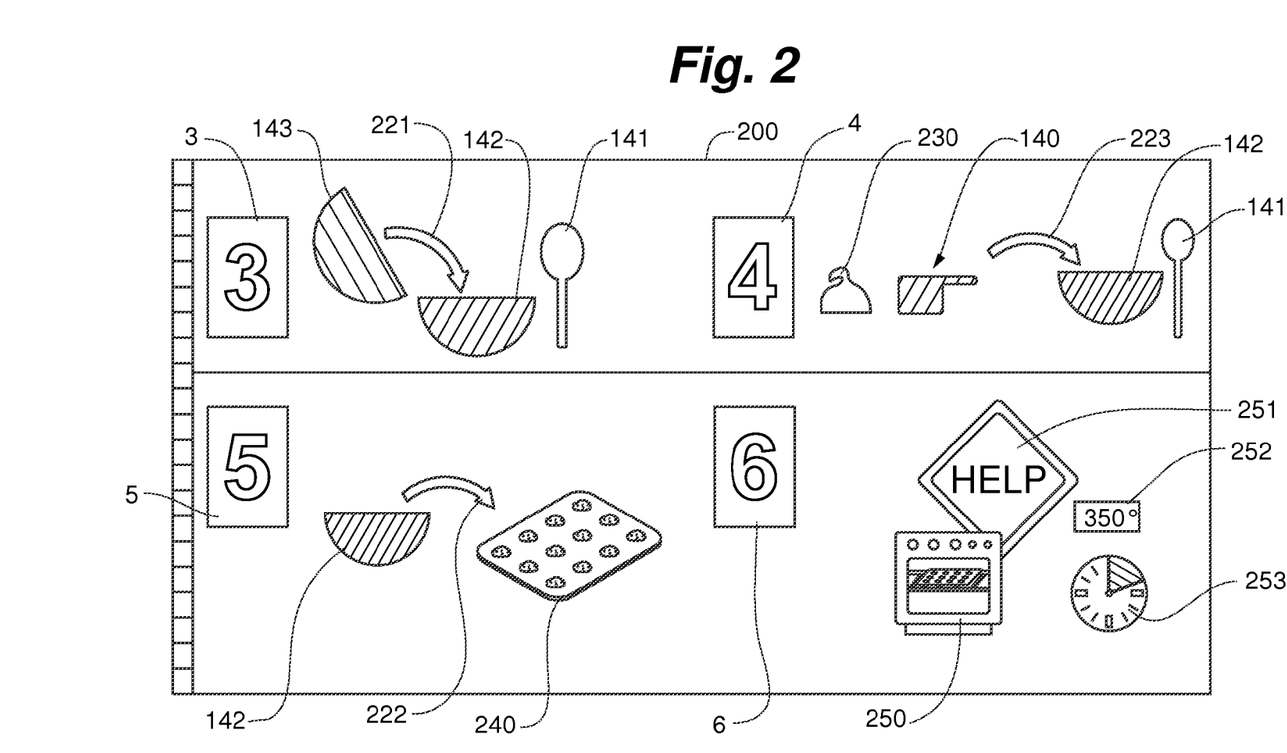
FIG. 2 is a schematic diagram depicting a second recipe book page in the system for presenting recipe instructions.

FIG. 2 shows a second recipe page 200 that gives further instructions for completing the recipe on recipe page 100. Page 200 contains numerical steps 3, 4, 5, and 6. Bowl images 142, 143 are again used to present further steps involved in completing the recipe of recipe page 100. Arrow image 221 is an instruction image indicating that the contents of bowl 143 should be transferred into bowl 142. The spoon image 141 indicates that the contents of bowl 142 should be mixed together using a spoon. Chocolate chip image 230 indicates that chocolate chips should be added in an amount indicated by measurement image 140. Instruction image 223 indicates that chocolate chips, represented by chocolate chip image 230 should be added to bowl 142, then mixed using a spoon represented by spoon image 141.

In numerical step 5 of FIG. 2, cooking tool images 222, 142, and 240 collectively form an instruction step image. The arrow image 222 instructs to form the contents of bowl 142 into dough balls and place them on a cookie pan, represented by cookie pan image 240. Numerical step 6 adds an additional instruction. The image of sign 251 indicates that a child should not perform numeric step 6. The image of an oven 250 is an instruction to place the cookie pan in an oven. The oven temperature 252 and the clock image 253 represent instructions to bake the cookies for 12 minutes at 350 Fahrenheit.

Figure 3:
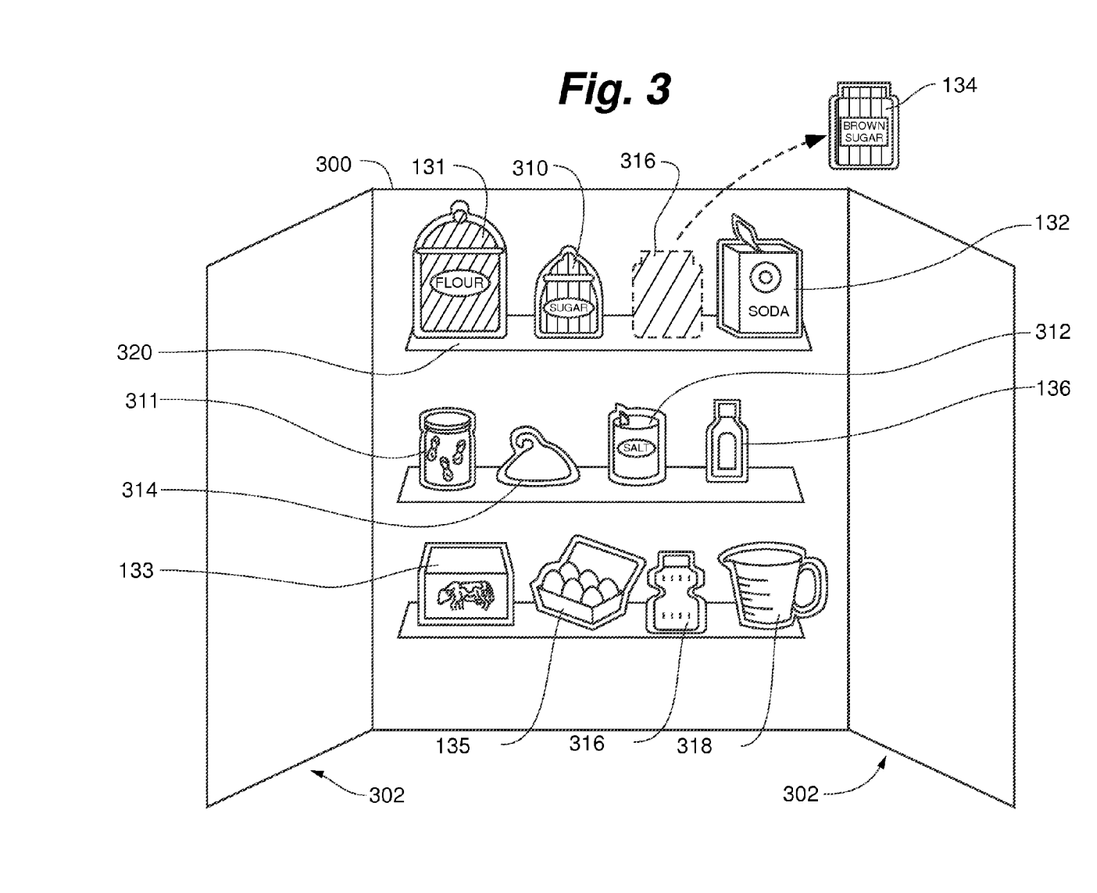
FIG. 3 is a schematic diagram of a sticker cupboard used in the system for presenting recipe instructions.

FIG. 3 presents a sticker holder or cupboard 300 that holds ingredient sticker icons representing a variety of ingredients that may be used in recipes in a recipe book according to the disclosed embodiments. The sticker cupboard 300 shown in FIG. 3 is decorated to resemble a real cupboard, but could also be implemented without such decoration. Sticker cupboard 300 is preferably made of a durable material such as cardboard, metal, or laminated paper. In one embodiment the sticker cupboard 300 is a stand-alone booklet separate from a recipe book, but sticker cupboard 300 could also be incorporated into the pages or cover of the associated recipe book.

In the embodiment shown in FIG. 3, sticker cupboard 300 has two wings 302 that are able to fold inward and outward, giving the impression of doors on a cupboard. An image of a "shelf" 320 gives the impression of real shelves on which ingredients might rest. Ingredient stickers such as stickers 131-136 and 310-318 are removably attached to sticker cupboard 300 in a manner that gives the impression of ingredients on shelves in a cupboard. In one embodiment of the invention, each ingredient sticker is matched to a specific location on the sticker cupboard 300. In the embodiment of FIG. 3, the sticker cupboard 300 is provided with an area 316 that is the same shape as ingredient sticker 134. Area 316 is a visual reminder that sticker 134 belongs at that location on sticker cupboard 300. Area 316 may be a greyed or hatched area, or could alternately be a duplicate image of the image portrayed on sticker 134. An alternate embodiment of sticker cupboard 300 may not utilize area 316. In one embodiment, a sticker cupboard 300 for holding stickers 131-136, 310-318 could include multiple sheets or pages in order to hold more stickers 131-136, 310-318 than could be held on a cupboard 300 formed of a single sheet.

Figure 4:
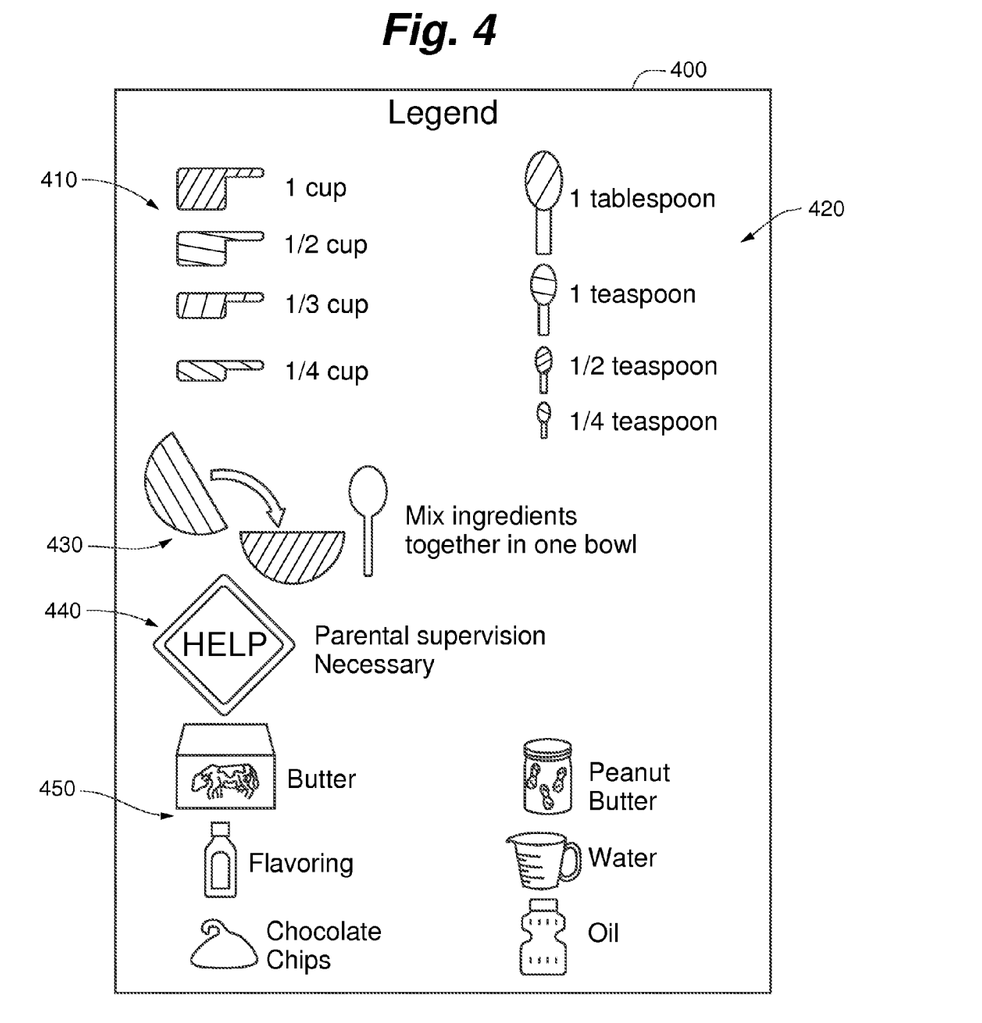
FIG. 4 is a schematic diagram of a legend for explaining the meaning of images in a picture cookbook.

FIG. 4 is an exemplary legend 400 to be used with a picture recipe cookbook. Legend 400 allows a reader to interpret the pictures on recipe pages. The reader may be an adult or parent helping a child non-reader prepare recipes in the cookbook. Measurement images 410 and 420 are depicted in the legend as having different coloration, for example different colors. Images 410, 420 could also have different patterns, shapes, hues, etc. to differentiate the volume of measuring device to use when measuring an ingredient in a recipe. Mixing instruction image 430 instructs the reader to mix the ingredients of one bowl into another bowl using a spoon. Instruction image 440 indicates that parental supervision is required for instruction steps showing image 440. Ingredient images 450 have text next to the images to indicate what the ingredient images 450 represent. In one embodiment of the invention, every ingredient image, measurement image, and instruction image in the recipe book could be presented in the legend.

Figure 5:
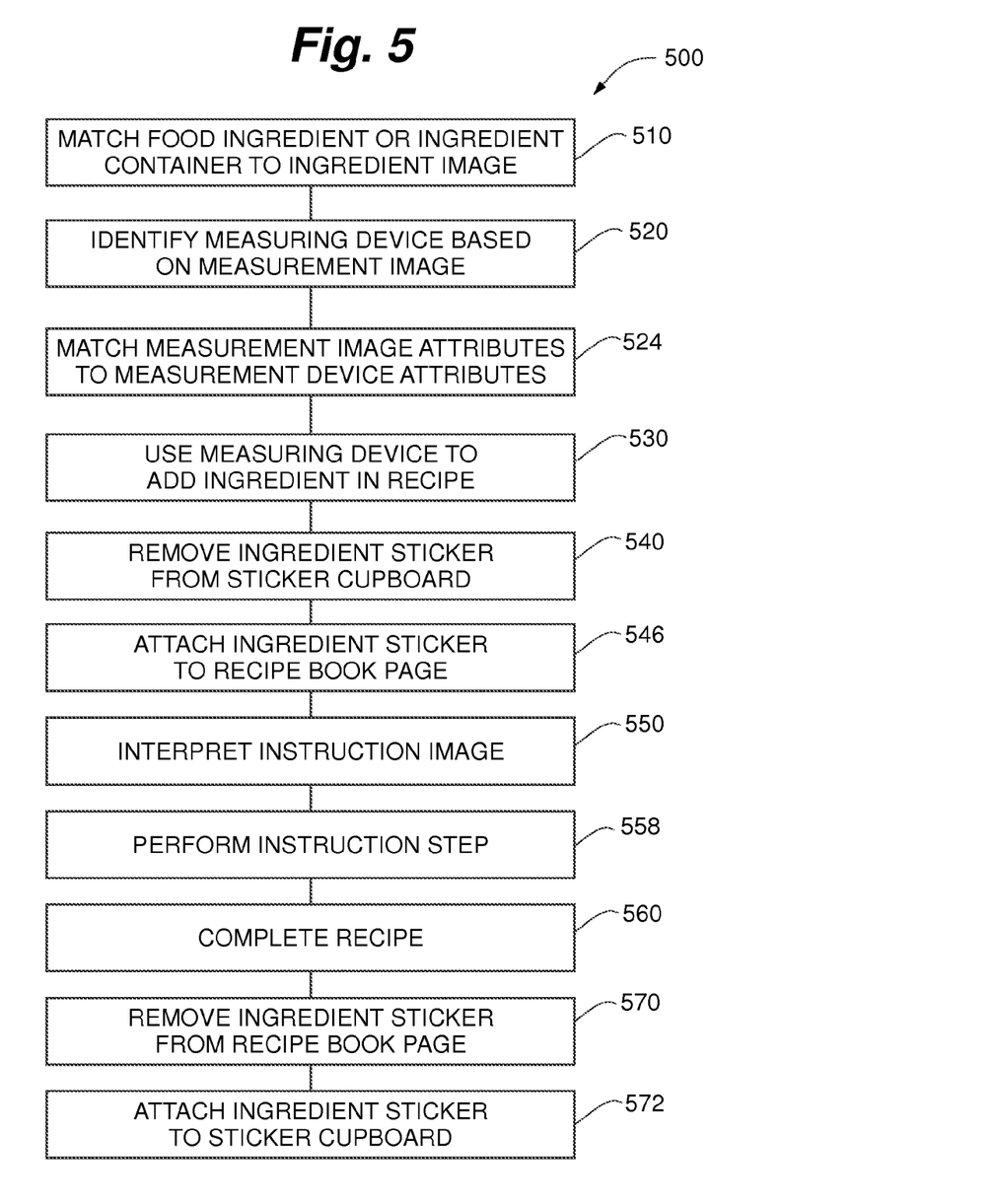
FIG. 5 is a flow chart demonstrating steps in a method for using a picture cookbook.

FIG. 5 presents a method 500 for using a picture recipe cookbook such as the cookbook shown and described in FIG. 1-2. In step 510, an ingredient image is identified to match an ingredient or ingredient container. For example, ingredient image 110 on recipe book page 100 is an image of a container for flour, and is identified to represent the ingredient flour. Ingredient image 230 of FIG. 2 is an image of a single chocolate chip, representing the ingredient chocolate chips.

In step 520, a measurement image or images are identified as representing a specific type of measuring device, such as measuring cups 139-140 or measuring spoons 156-157. In step 524 the measurement image attributes such as image coloration of measurement images 139-140 are identified to represent the measured amount of ingredient to use in the recipe. In one embodiment, multiple measuring devices are provided with the recipe book. In this embodiment each measuring device would have the same coloration as a measurement image. The measurement image 140 may, for example be colored blue, and measurement image 139 may be colored red. The coloration of measurement images 139, 140 indicate that a blue measuring cup and a red measuring cup are required. This allows the non-reader to quickly identify which measuring device to use. In step 530 the measuring device identified in step 524 is used to measure the ingredient identified in step 520, and the ingredient is added to the food mixture.

In step 540, an ingredient sticker such as sticker 131 is removed from sticker cupboard 300. In step 546 the ingredient sticker 131 is removably attached to recipe book page 100. Ingredient sticker 131 may be placed directly on top of ingredient image 110. Ingredient sticker 131 could also be placed on some other location on recipe book page 100. By placing the sticker 131 into the book, the user can track which steps in the recipe have been performed. In this way, a child will not easily lose his or her place in the recipe. In an alternate embodiment utilizing measurement stickers, a measurement sticker depicting the measurement image could be removed from the sticker cupboard 300 and placed on or near the measurement image identified in step 520.

In step 550, an instruction step image is identified and used to interpret an instruction step to perform, such as mixing or heating. Instruction step images may include cooking tool images such as cooking tool images 141 and 144 of FIG. 1, which represent the instruction steps stirring and whisking, respectively. In step 558, the instruction step is performed. In an alternate embodiment using cooking tool stickers, a cooking tool sticker could be removed from sticker cupboard 300 and placed on or near the cooking tool or instruction step image, indicating that the instruction step has been completed.

Steps 510-558 are performed as many times as necessary to complete the recipe on the recipe pages. After all ingredients have been added and all instructions have been performed, the recipe is complete at step 560. After step 560, one or more ingredient stickers are detached from the recipe page 100 in step 570. In step 572 ingredient stickers are reattached to the sticker cupboard 300. Steps 570 and 572 are repeated for all stickers attached to recipe page 100.

Figure 6:
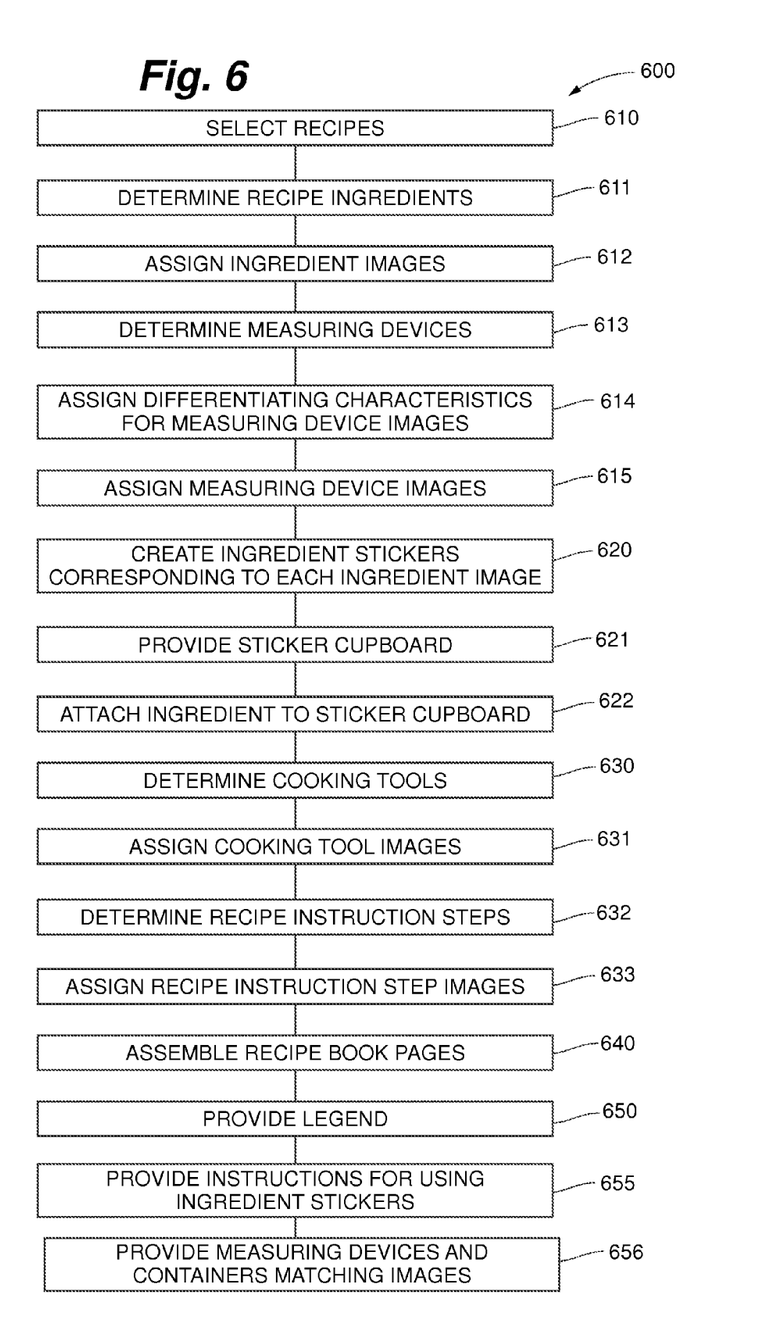
FIG. 6 is a flow chart demonstrating steps in a method for creating a picture recipe instruction book.

FIG. 6 presents a method 600 for creating a picture recipe book and related items. In step 610, one or more recipes are selected to be included in a recipe book. The recipes may be cooking or baking recipes, but could also be other types of recipes. Each recipe has ingredients, measuring devices, cooking tools, and instruction steps associated with the recipe. To create the picture recipe book each of these must be translated from text into picture form. In step 611, the ingredients from all recipes included in the recipe book are determined (some ingredients will be used in more than one recipe). In step 612 all recipe ingredients are assigned an ingredient image that portrays each ingredient in a recognizable manner. An ingredient image could be a picture of the ingredient, such as the image of chocolate chip 230 in FIG. 2. The ingredient image could also be a picture of a container for the ingredient, such as flour container image 131. The advantage of using a picture of an ingredient container rather than a picture of the ingredient itself is that an image of the ingredient flour would not necessarily be recognizable. An image of the ingredient flour might look indistinguishable from an image of the ingredient white sugar. For some ingredients, using a container image to represent the recipe ingredient is therefore the simplest way to implement step 612. In some embodiments, sub-components of the ingredients also need to be identified. For example, in FIG. 1, the eggs are displayed both in a carton 135 and as individual eggs 145. Images are therefore assigned to eggs as a general ingredient (such as image 135), and each egg 145 as a measurement for the number of eggs to use.

In step 613 measuring devices used in the recipes for the recipe book are determined. In one embodiment, the measuring devices include measuring cups and measuring spoons. It is also contemplated that other measuring devices could be used in the recipes, such as liquid measuring devices and scales for weighing ingredients. In step 614 differentiating characteristics are determined for measurement images. In one embodiment, the image differentiators are various colors, hues, shapes, shadings, or patterns to differentiate between different measuring values for the measuring images. In a preferred embodiment, a set of multicolored measuring devices is provided. In this embodiment each measuring device has a different volume and the image differentiators are colors that correspond to the color of a measuring device for a particular measured volume. In step 615 measurement images are assigned for each measurement value, for example measurement volume or weight.

After ingredient images and measurement images have been assigned, in step 620 ingredient stickers are provided. The ingredient stickers are markers that may be removably-attached to a recipe page. Step 620 includes determining an attachment method for the ingredient stickers. Each ingredient sticker may have a tacky or sticky back, a hook-and-loop style fastener, static-cling vinyl, or may be magnetic. In the preferred embodiment every ingredient image has a corresponding ingredient sticker. An ingredient sticker corresponding to an ingredient image may depict the ingredient image, allowing a non-reader to quickly identify that the particular ingredient sticker belongs to the ingredient image. The ingredient sticker may be the same size as the ingredient image, but could be larger or smaller.

In some embodiments, only a single ingredient sticker is created for each ingredient. In other embodiments, multiple stickers are created to track the amount of ingredient used in a recipe. For instance, FIG. 1 may use two butter stick stickers corresponding to butter stick images 147 and two egg stickers corresponding to egg images 145 to track the amount added to the recipe. In other embodiments, only a single sticker is used and provided for the ingredients. Ingredient stickers are stored in a sticker cupboard that is provided in step 621. The ingredient stickers may attach to the sticker cupboard when not in use. In step 622 ingredient stickers are removably-attached to the sticker cupboard for storage.

In step 630 cooking tools necessary for recipe preparation are determined. Such cooking tools may be bowls, spoons, whisks, pots and pans, etc. Each cooking tool is assigned a cooking tool image in step 631. In step 632 recipe instructions necessary for recipe preparation are determined. Steps may include mixing, heating, portioning, and other such recipe preparation steps. Each instruction step is assigned an instruction image in step 633. Instruction images may incorporate cooking tool images in order to better illustrate the steps necessary to complete the recipe.

In step 640 recipe pages are assembled. This step includes arranging images on recipe pages to illustrate the ingredients, measurement amounts, and instruction steps for each recipe. Each recipe page is designed to show images in a particular order, specifically, in chronological order beginning from a first step of the recipe to a last step of the recipe. After recipe pages are assembled, the recipe pages are preferably arranged in a logical order to create a recipe book. For example, recipes could be listed in the recipe book by category (e.g., desserts), by food ingredient (e.g., "chocolate recipes"), alphabetically, or in some other order.

In step 650, a legend is provided for the recipe book, such as legend 400 of FIG. 4. The legend explains the meaning of various images in the recipe book. In one embodiment the legend provides text next to the ingredient images, measurement images, and instruction images in order to help a reader interpret the images in the recipe book. The reader may then give assistance to a non-reader when preparing recipes. In some embodiments a legend may not be present, but in this case the images in the recipe book must be very clear so as to avoid ambiguity.

In step 655 instructions are provided for using stickers with the recipe book. The sticker instructions provide instructions to add an ingredient in a recipe, then detach a corresponding sticker from the sticker cupboard holder and attach the sticker to the recipe page at a position on or near the corresponding image. The sticker instructions further provide instructions to detach the sticker from the recipe page and store the sticker in the sticker cupboard when the recipe has been completed. The instructions in step 655 may be in text form, but could also be presented in image form. In an embodiment using ingredient stickers, instructions are provided to place an ingredient sticker on a recipe page to signify that the ingredient has been added in the recipe. In an embodiment using measurement stickers, instructions are provided to place a measurement sticker on a recipe page to signify that the measuring device has been used to add an ingredient. In an embodiment using cooking tool stickers or instruction stickers, instructions are provided to place a cooking tool sticker or instruction sticker on the page to signify that an instruction step has been completed.

In step 656 a set of measuring devices and ingredient containers are provided with the picture recipe book. The measuring devices and ingredient containers are designed to look similar to corresponding measurement images and ingredient images assigned in steps 615 and 612. The measurement images and ingredient images could be drawings or photographic images of the measuring devices and ingredient containers.

The many features and advantages of the invention are apparent from the above description. Numerous modifications and variations will readily occur to those skilled in the art. For example, the recipe book could provide text for a reader next to the images for a non-reader. Since such modifications are possible, the invention is not to be limited to the exact construction and operation illustrated and described. Rather, the present invention should be limited only by the following claims.

What is claimed is:

1. A method for preparing a food mixture using a picture recipe cookbook, the method comprising:
 a) identifying an ingredient image in a recipe on a recipe book page, the ingredient image representing a food ingredient to be added to the food mixture;
 b) identifying a measurement image on the recipe book page, the measurement image representing a measurement value;
 c) adding the food ingredient to the food mixture in an amount equal to the measurement value represented by the measurement image;
 d) detaching a removably attachable ingredient sticker from a sticker holder; and
 e) removably attaching the ingredient sticker to the recipe book page in near proximity to the ingredient image;
 wherein attaching the ingredient sticker to the recipe book page indicates that the ingredient has been added to the food mixture.

2. The method of claim 1, wherein the measurement image is a measuring device image having a coloration, and the coloration of the measuring device image indicates the measurement value.

3. The method of claim 2, wherein step b) further comprises matching the coloration of the measurement image to a coloration of a measuring device; and further wherein step c) further comprises adding the food ingredient to the food mixture using the measuring device having the same coloration as the measurement image.

4. The method of claim 1, wherein the ingredient sticker depicts the ingredient image.

5. The method of claim 4, wherein the ingredient image is an image of an ingredient container.

6. The method of claim 1, further comprising:
 f) detaching the ingredient sticker from the recipe book page after completing the recipe; and
 g) removably attaching the ingredient sticker to the sticker holder.

7. The method of claim 6, wherein the sticker holder holds a plurality of ingredient stickers for a plurality of ingredient images on the recipe book page.

8. The method of claim 1, further comprising:
   f) identifying an instruction image on the recipe book page, the instruction image representing an instruction step to perform on the food mixture;
   g) identifying a cooking tool image on the recipe book page, the cooking tool image indicating a cooking tool to be used with the instruction step; and
   h) using the cooking tool to perform the instruction step on the food mixture.

9. The method of claim 1, wherein the ingredient sticker and the ingredient image are identically sized.

10. The method of claim 3, wherein the measurement image is at least one of a measuring cup image and a measuring spoon image.

11. A picture recipe cookbook system comprising:
   a) a recipe book having a plurality of recipes represented on a plurality of recipe book pages;
   b) an ingredient image on a first recipe page for a first recipe, the ingredient image representing a food ingredient to be added in a recipe;
   c) a first measurement image on the first recipe page in near proximity to the ingredient image, the first measurement image representing that the food ingredient should be added in the recipe in a measured amount, the measured amount being symbolized by a first coloration of the first measurement image;
   d) a cooking tool image and an instruction image on the first recipe book page, the cooking tool image and instruction image collectively representing an instruction step to be performed in the recipe; and
   e) a removably attachable marker attached to a marker holder and moveable between the marker holder and an attached position on the first recipe book page, the marker depicting one of the ingredient image, the measurement image, the cooking tool image, and the instruction image;
   wherein the marker, when attached to the recipe book page, represents that a recipe step has been completed.

12. The system of claim 11, wherein the measured amount symbolized by the first coloration is a first volume, the system further comprising:
   f) a first measuring device having the first coloration and the first volume;
   g) a second measuring device having a second coloration different from the first coloration and a second volume different from the first volume;
   wherein the first coloration of the measurement image represents that the first measuring device should be used to add the food ingredient in the recipe.

13. The system of claim 11, wherein the marker holder is separate from the recipe book.

14. The system of claim 11, wherein the recipe book pages have a plurality of different ingredient images, each ingredient image representing a recipe ingredient, and the marker holder holds a plurality of markers depicting the plurality of different ingredient images.

15. The system of claim 11, further comprising:
   f) a second recipe page for a second recipe, the second recipe page depicting the ingredient image;
   wherein the marker depicts the ingredient image, the marker is movable to an attached position on the second recipe page, and the marker, when attached to the second recipe page, represents that the food ingredient has been added in the second recipe.

16. The system of claim 11, wherein the ingredient image is one of a drawing of an ingredient container for the food ingredient and a photographic image of the ingredient container for the food ingredient, and the marker depicts the ingredient image.

17. The system of claim 12, further comprising:
   f) a legend on a legend page of the cookbook, the legend depicting
      i) the first measurement image with the first coloration symbolizing the first volume,
      ii) a second measurement image with the second coloration symbolizing the second volume,
      iii) a first text written instruction in near proximity to the first ingredient image, and
      iv) a second text written instruction in near proximity to the second ingredient image;
   wherein the first text instructs to use the first measuring device and the second text instructs to use the second measuring device.

18. The system of claim 17, wherein the recipe book pages do not contain the first text and second text.

19. A method for creating a recipe book, comprising:
   a) selecting one or more recipes for the recipe book, the recipes comprising ingredients, measurement volumes, and instruction steps;
   b) assigning ingredient images to represent each of the ingredients to be used in the recipes;
   c) assigning measurement images to represent each measurement volume to be used in the recipes;
   d) assigning a differentiator to each of the measurement images, the differentiator being at least one of an image size, color, shape, and pattern;
   e) assigning instruction images to represent each instruction step;
   f) for each recipe, arranging the ingredient images, measurement images, and instruction images on one or more recipe pages to represent the procedure for executing each recipe;
   g) assembling the recipe pages to form a recipe book; and
   h) providing a removably attachable ingredient sticker for each ingredient image, each ingredient sticker depicting a corresponding ingredient image.

20. The method of claim 19, further comprising:
   i) providing a legend for the recipe book, the legend identifying and explaining the meaning of at least one of the ingredient images, measurement images, and instruction images.

21. The method of claim 19, further comprising:
   i) providing a sticker storage space to hold each ingredient sticker.

22. The method of claim 21, wherein the sticker storage space is separate from the recipe book.

23. The method of claim 19, wherein the instruction images include cooking tool images representing cooking tools to use when performing instruction steps.

24. The method of claim 19, wherein one or more of the ingredient images depict a container for an ingredient.

25. The method of claim 19, further comprising:
   i) providing with the recipe book
      i) a measuring device having a same color as a measurement image, and
      ii) an ingredient container;
   wherein an ingredient image in the recipe book is one of a drawing and a photograph of the ingredient container.

26. The method of claim 25, further comprising:
   j) providing a sticker storage space separate from the recipe book.

* * * * *